Sept. 12, 1950 P. B. MITCHELL 2,522,459
PIPE ALIGNING TOOL
Filed Oct. 16, 1944 2 Sheets-Sheet 1

Inventor
Presse B. Mitchell
By
A. F. Flournoy Attorney

Sept. 12, 1950        P. B. MITCHELL        2,522,459
PIPE ALIGNING TOOL
Filed Oct. 16, 1944                    2 Sheets-Sheet 2
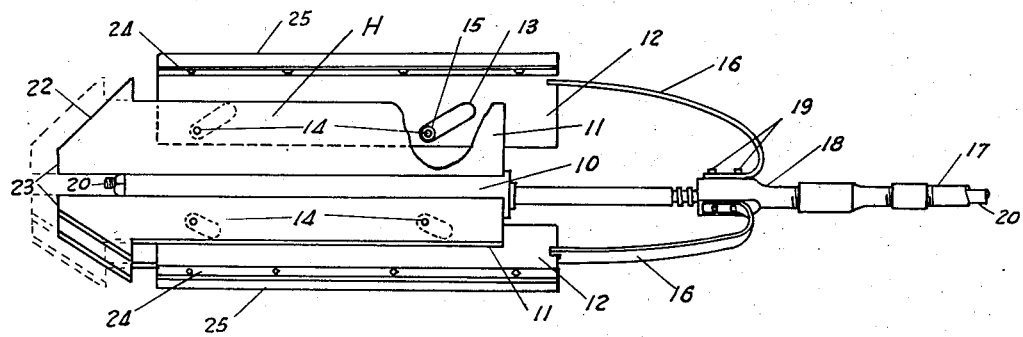
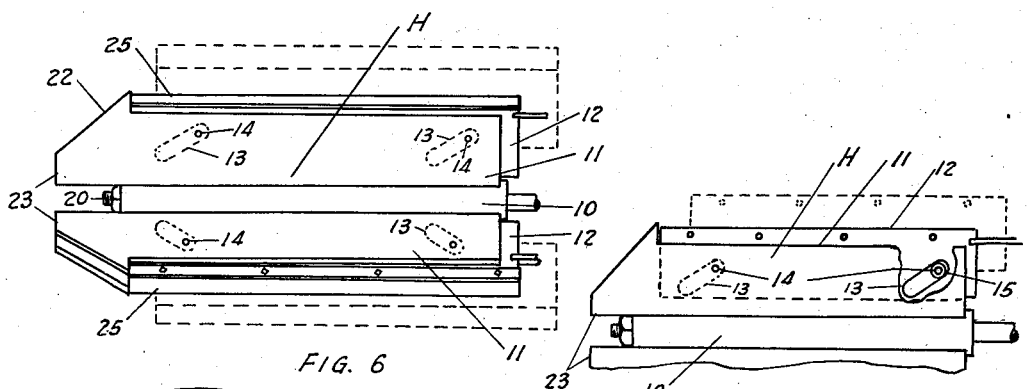
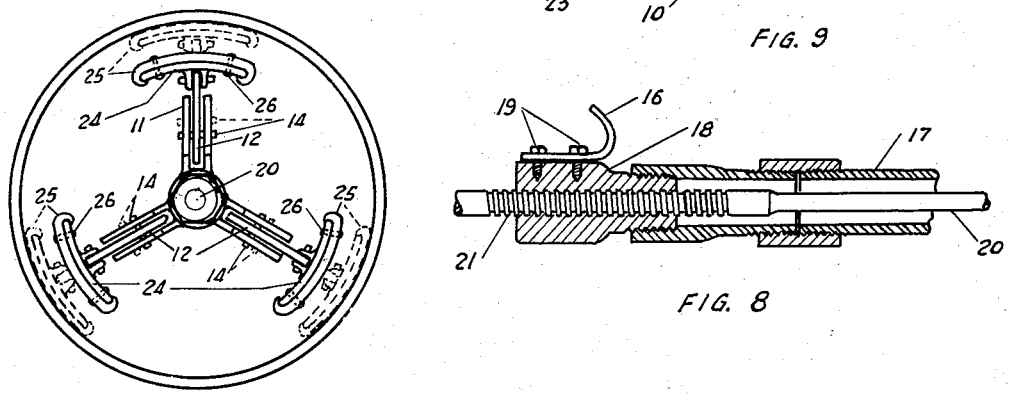
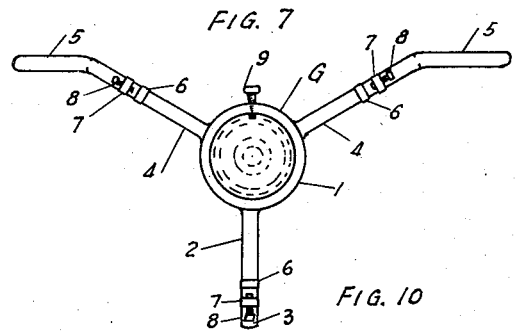
Inventor
Presse B. Mitchell
By
A. F. Flournoy   Attorney Patented Sept. 12, 1950

2,522,459

UNITED STATES PATENT OFFICE 2,522,459

PIPE ALIGNING TOOL

Presse B. Mitchell, Longview, Tex.

Application October 16, 1944, Serial No. 558,884

8 Claims. (Cl. 113—103)

My invention relates to pipe aligning tools.

An object of my invention is to provide a pipe aligning tool with a collapsible head that may be inserted through the exposed end of a section of pipe in a collapsed form by means of a handle extending from it and pushed through the other end of the section into an adjacent section of pipe to which the first mentioned section is to be joined and then be expanded to align the adjacent ends of the joining sections of pipe into exact alignment with each other and adapted also to be collapsed and withdrawn by its handle after the sections of pipe have been joined by a weld or other means.

Another object of my invention is to provide a pipe aligning tool with shoe members that are curved to fit the inside of sections of pipe that are aligned by it and which shoe members are adapted to serve as backing members during the joining of the aligned pipe sections by a welding operation to insure a smooth internal surface at the joining line of the pipe sections.

Another object of my invention is to provide a pipe aligning tool that is also adapted for use in straightening pipe, especially in straightening out dents in pipe.

Other objects and advantages of my invention will appear in the course of my detailed description to follow further on in this specification in connection with my accompanying drawings which illustrate a form of aligning tool that embodies my invention.

In the drawings:

Figure 5 is an enlarged side elevation view of the head portion of my pipe aligning tool in an expanded position.

Figure 6 is a fragmentary view of the structure illustrated in Figure 5 showing the head portion in collapsed position.

Figure 7 is a left end view of the head portion illustrated in Figure 5.

Figure 8 is an enlarged view of a portion of my pipe aligning tool.

Figure 9 is a fragmentary view of a modification of the head portion of my pipe aligning tool, and Figure 10 is an elevation view of a portion of my pipe aligning tool.

Figure 1:
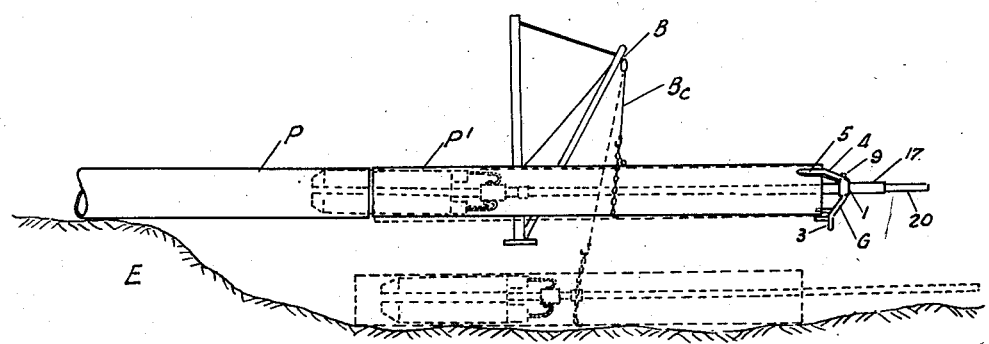
Figure 1 is a side elevation view of a pipe aligning tool in an operating position that embodies my invention.

Referring to Figure 1, two sections of pipe, P and P', that have been aligned with my pipe aligning tool will be seen, and it will be understood that the portion designated by P might be the exposed end of a string of pipe a mile long buried or partially buried in the earth E. The portion of the pipe designated by P' is a single length of pipe, the weight of which is supported by the lifting boom B. Other means may be used to support the length of pipe P' if desired.

In the laying of large size interstate gas and oil lines, wherein my invention is very useful, special pipe lifting power driven devices are often employed. However, since such devices form no actual part of my invention, none are shown in my drawings.

Briefly stated, my pipe aligning tool consists in an expansible head H and a centering guide G through which a tubular support or hollow handle 17 and an expanding rod 20 inside of the hollow handle 17 extending from the expansible head H are slidably mounted.

Before going into the detailed description of the expansible head H itself, I will describe the centering guide G and explain its uses. The centering guide G has a centrally positioned hub 1 from which three equally spaced arms radiate. The bottom arm 2 terminates in a short leg portion 3 while the upper pair of arms 4 terminate in handles 5. The bottom arm 2 and also the upper pair of arms 4 are provided with pairs of lugs, inner lugs 6 and outer lugs 7, which are adapted to fit on the inside and the outside of the end of pipe length P'. Set screws 8 threadedly engaged with the outer lugs 7 are used to clamp the centering guide G to the end of the pipe P'. A set screw 9 is also threadedly engaged with and extended through a wall portion of the hub 1 for use in clamping the hollow handle 17 of the aligning tool in adjusted positions through the hub 1.

A clearer understanding of the part that the centering guide G plays may be obtained by visualizing the length of pipe P', in its initial position shown in the dotted lines, on the earth E. The pipe aligning tool may be brought toward the pipe P' by two men by means of the centering guide G into which the handle 17 is clamped at a position near the expansible head H of the pipe aligning tool. This is done after the boom chain Bc has been looped around the pipe length P'.

The upper arms 4 of the centering guide G are so positioned that the handles 5 may be held by men at waist height to bring the expansible head H of my pipe aligning tool into position for inserting it into the end of a length of pipe P' when it is lying on the earth E in the dotted line position shown in Figure 1. While not absolutely necessary, it is convenient in carrying my pipe aligning tool to the pipe P' to have a third workman assist by holding up the extended end of the hollow handle 17. When the expansible head H is inserted into the end of pipe length P', the centering guide G is fitted onto the end of the pipe length P' and clamped to it with the set screws 8. Now with the set screw 9 in the hub 1 backed out from clamping position, the expansible head H is pushed through the pipe P' in its collapsed position by means of the handle 17 until its tapered centering nose 23 is sticking out. After the pipe P' has been raised by the lifting boom B, it may be steered into aligning position with the string of pipe P by means of the pipe aligning tool handle 17 which is again clamped to the centering guide G.

The boom chain Bc is placed around the pipe length P' carrying the pipe cleaning tool near the center position of the pipe length P' to substantially balance it when lifted by the boom B.

When the hollow handle 17 is clamped to the centering guide G with the set screw 9, the hollow handle 17 can be used as a handle for the pipe length P' for either tilting the joining end of the length of pipe P' up and down or for pushing it to and from the end of the string of pipe P to which it is to be joined.

As soon as the centering nose 23 of the expansible head H is positioned in a string of pipe P, the set screw 9 in the hub 1 is loosened and the expansible head H is shoved farther into the string of pipe P by means of the handle 17 to a position where about half of it is in the string of pipe P and its other half in the length of pipe P'. In this position it is expanded as explained hereafter in connection with my detailed description of the expansible head H itself.

The expansible head H is made up with a main body portion or support member 10 from which three equally spaced triplicate vane guides 11 extend in radial directions. Each of the vane guides 11 comprises a pair of spaced, parallel members and carries between said members a movable vane 12 that is slidably mounted in the vane guide 11 and connected therewith by means of a pair of duplicate rearwardly slanting cam slots 13 and a pair of guide pins 14 extended through the slanting cam slots 13 and secured in the vane guide 11. All of the slots 13 are of equal length and are spaced at equal radiuses from the center line of the main body portion 10.

While not absolutely necessary, preferably rollers 15 are mounted in the guide pins 14 to cut down friction and prevent excessive wear in the operation of this pipe aligning tool.

It is to be understood that while I find three vanes 12 very satisfactory, the expansible head H will work with two vanes 12 or more than three vanes 12, if desired.

Flexible straps 16 are welded to the inner ends of the vanes 12 and bolted to the handle hub 18 by means of bolts 19. The hollow handle 17 is made long enough to extend out of the end of a standard length of pipe P' as shown in Figure 1.

Figure 4:
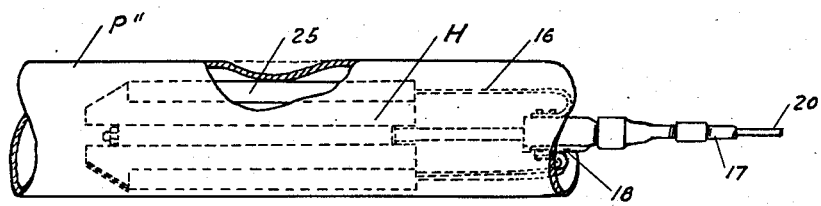
Figure 4 is a side elevation view of my pipe aligning tool illustrating its use in straightening pipe.

The hollow handle hub 18 is internally threaded. An expanding rod 20 is rotatably mounted in the main body portion 10 of the expansible head H but held against longitudinal movement relative thereto. The rod 20 is provided with an enlarged threaded portion 21 threadedly engaged with the handle hub 18 through which it extends. When the hollow handle 17 is held stationary and the expanding rod 20 is turned clockwise, the main body portion or supporting member 10 of the expansible head H including the vane guides 11 is moved to the left (as seen in Figure 5) longitudinally with respect to the handle 17 and the movable vanes 12 attached to the handle hub 18 by means of the flexible straps 16. Thus it will be seen that when the main body portion 10 is moved with respect to the vanes in a leftward direction as seen in Figure 4, the relative movement of the guide pins 14 and cam surfaces of the slanting slots 13 pushes the vanes 12 outwardly toward the expanded position as seen in Figure 5 of the drawings. A relative movement of the main body portion 10 to the right causes the vanes 12 to move in toward the collapsed position of the expansible head H.

The description thus far related describes a practical expansible head H. I prefer, however, to form slanting edges 22 on the forward ends of the vane guides 11 to form the centering nose 23 referred to earlier in this specification. I prefer also to provide removable curved members 24 on the outer edges of the vanes 12 for contacting the inner surfaces of pipes.

Figure 2:
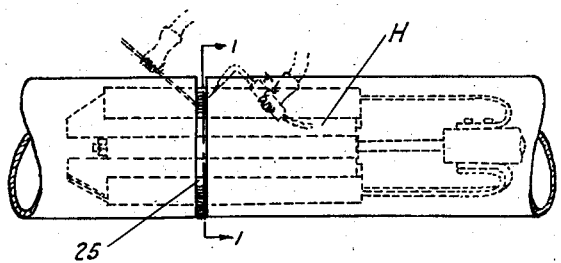
Figure 2 is an enlarged side elevation view of a portion of the structure illustrated in Figure 1 that illustrates a welding operation.
Figure 3:
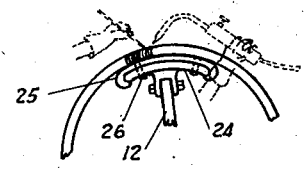
Figure 3 is a fragmentary cross section view taken on line 1—1 of Figure 2.

Each of the curved members 24 is provided with facing layer of copper 25 to enable it to serve as a backing surface during the operation of welding the aligned ends of the pipe line P and the pipe length P' together as best seen in Figure 2 and Figure 3. The copper layer 25 may be secured in place by copper rivets 26 and by crimping its edges. Copper makes an excellent backing metal for the reason that it will not fuse with either the metal of the pipe P and the pipe length P' nor with the welding metal. Copper is such an excellent conductor of heat that while its melting point is not as high as steel, it does not melt under the welding heat. The heat the copper layer 25 receives at the welding spot is rapidly conducted away into its areas adjacent to the welding spot. While other surfacing materials might be substituted for copper such as ceramic materials and some other metals, the copper coating serves the purpose excellently.

As a matter of convenience, I shall hereinafter refer to the vane 12, either with or without member 24 and facing 25 attached, as a "shoe." It will be noted that each of these shoes, when provided with the curved member 24, extends circumferentially through a considerable arc, and also extends a substantial distance longitudinally, the length of such shoes being illustrated in the drawings as greater than the diameter of the pipe. This relatively great length serves to effectively line up the adjacent pipe sections for welding, as shown in Figs. 1 and 2.

During the welding operation, after the first three welds have been made over the three shoes, the expansible head H is slightly collapsed and rotated a part of a turn to move the shoes 24 to new weld backing positions. The complete encircling welding operation can be accomplished with only two or three positionings of the shoes.

I make the members 24 detachable from the vanes 12 so that by a mere change in the size and shape of these members the basic organism of my pipe aligning tool may be used with several different sizes of pipe. I also wish to point out that a change in the positions of the guide pins 14 only will bring about a change in the ultimate extended position of the shoes. For example, if the pins 14 are spaced a greater radial distance than shown in Figure 5, the shoes will move out a greater distance than is possible with the position of the pins 14 in Figure 5.

When my pipe aligning tool is used to straighten out kinks in pipes, it is pushed into a pipe, such as the pipe length P'' in Figure 4, with the expansible head H in collapsed position and then rotated in the pipe length P'' until one of the shoes is brought under the dent in the pipe P''. Then the expansible head H is expanded by turning the expanding rod 20 until the shoes under the dent pushes the dent out of the pipe P''. In practice the dented portion is heated by means of a blow torch sufficiently to soften it.

The modified expansible head H' shown in Figure 9 is in fact merely the expansible head H illustrated in Figure 5 with the shoes removed. This modified form of expansible head H' is well adapted for straightening out dents in pipes such as the pipe length P'' in Figure 4. If desired, a special form of shoe could be clamped on one of the vanes for use in pushing dents out of pipes.

Various changes in the size and arrangement of parts of the above described aligning tool may be resorted to within the scope of my invention. No need is seen to go into the details of construction and materials relative to the making of my pipe aligning tool since this is within the expected knowledge of general machine shop practice.

Having thus described my invention, I claim:

1. A pipe aligning tool comprising an expansible head including an elongated main body portion provided with vane guides extending in radial directions with respect to the center line of said elongated main body portion, each of said vane guides carrying a vane adapted to move in said guide in radial directions, each of said vanes being provided with a slot through which a guide pin fastened to said vane guide is extended, each of said vanes being connected by means of a flexible strap to an internally threaded boss and a means for moving said vanes including an externally threaded expanding rod secured to and extending from said main body portion in threaded engagement with said internally threaded boss, whereby a rotary movement of said expanding rod with respect to said boss produces a longitudinal movement of said main body portion with respect to said vanes resulting in radial movements of said vanes with respect to said main body portion.

2. A pipe aligning tool comprising an elongated expansible head, said expansible head comprising a main body portion including a plurality of fixed vane guides arranged in lengthwise and radial directions with respect to the longitudinal center line of said main body portion, each of said vane guides carrying a movable vane adapted to move in radial directions with respect to said center line of said main body portion, a means for moving said vanes in radial directions in said vane guides including expanding means interposed between said vanes and guides, a hollow handle and a rod extending therethrough for operating said expanding means, said rod being rotatably mounted in but longitudinally fixed with respect to said main body portion, flexible means connecting the hollow handle with the movable vanes, a centering guide adapted to center said hollow handle in a pipe, and means for clamping said centering guide to the end of the pipe and to said hollow handle.

3. A pipe aligning tool comprising an expansible head including an elongated main body portion including vane guides extending in radial directions with respect to the center line of said main body portion, each of said vane guides carrying a vane adapted to move in radial directions in said vane guide, each of said vanes being provided with a plurality of parallel slanting slots through which guide pins fastened to said guides are extended, each of said vanes being connected by means of a flexible strap to an internally threaded tubular handle extending centrally from ends of said vanes, a means for moving said vanes including an externally threaded expanding rod secured to and extending from an end of said main body portion, said expanding rod being extended through said tubular handle in threaded engagement with the same, whereby a rotary movement of said expanding rod with respect to said tubular handle produces a longitudinal movement of said main body portion with respect to said vanes resulting in radial movements of said vanes with respect to said main body portion and a centering guide adapted to center said tubular handle and said expanding rod within said tubular handle in a central position in a pipe, said centering guide being provided with clamping means for clamping the same on the end of a pipe, said centering guide including also a clamping means for clamping said tubular handle in longitudinally adjusted positions through said centering guide, whereby said tubular handle is adapted for use as a handle member for moving a pipe in which said pipe aligning tool is positioned.

4. The device as claimed in claim 3 wherein a curved member is provided on each of said vanes in position to contact the inner surfaces of opposed ends of pipes aligned by said pipe aligning tool.

5. The device as claimed in claim 3 wherein an arcuate curved member is provided on each of said vanes in position to contact inner surfaces of opposed ends of pipes aligned by said pipe aligning tool and wherein the outer surface of one or more of said members consists in a layer of copper adapted to serve as a backing member in a welding operation.

6. A pipe aligning tool comprising an expansible head including an elongated main body portion provided with vane guides extending in radial directions with respect to the center line of said elongated main body portion, each of said vane guides carrying a vane adapted to move in said guide in radial directions, each of said vanes being provided with a slot through which a guide pin fastened to said vane guide extends, means for connecting each of said vanes to an internally threaded boss in such manner as to permit radial movement of said vanes relative thereto, and a means for moving said vanes including an externally threaded expanding rod rotatably secured to and extending from said main body portion in threaded engagement with said internally threaded boss, whereby a rotary movement of said expanding rod with respect to said boss produces a longitudinal movement of said main body portion with respect to said vanes, resulting in radial movements of said vanes with respect to said main body portion.

7. A pipe aligning tool adapted to be inserted into one end of a section of pipe and to extend beyond the other end thereof, said tool comprising a central supporting member, a plurality of radially disposed elongated shoes mounted on said member for longitudinal sliding movement with respect thereto, a hollow handle element, having an operating rod element housed concentrically therein and co-extensive therewith, one of said elements being connected with said central supporting member and flexible means connecting the other with said shoes, and said handle and rod elements being of such length as to project from the end of the pipe section into which the tool is inserted when said shoes are disposed adjacent the other end thereof, means actuated by the relative movement of said handle and rod elements for causing relative sliding movement of said supporting member and shoes, and means whereby such sliding movement serves to shift said shoes radially.

8. A pipe aligning tool adapted to be inserted into the bore of a pipe and having an elongated expansible head, said head comprising a body portion provided with a plurality of rigid vane guides extending longitudinally and radially with respect to the axis of said body portion, a vane disposed parallel with and adjacent each vane guide, means connecting each vane with its associated guide comprising a transverse pin carried by one member and an inclined slot formed in the other member, through which slot said pin freely passes, whereby relative longitudinal movement of said vane and guide imparts a radial movement to said vane, and mechanical operating means, in addition to said pin and slot connection, interposed between said vane guides and vanes for causing relative longitudinal movement thereof, said operating means including flexible, radially yieldable elements connected with said vanes.

PRESSE B. MITCHELL.

REFERENCES CITED

The following references are of record in the file of this patent:

UNITED STATES PATENTS

| Number | Name | Date |
|---|---|---|
| 81,420 | Shur | Aug. 25, 1868 |
| 410,630 | Ashforth | Sept. 10, 1889 |
| 1,392,798 | Rice | Oct. 4, 1921 |
| 1,654,737 | Kistner | Jan. 3, 1928 |
| 1,879,122 | Davis | Sept. 27, 1932 |
| 1,962,351 | Kane | June 12, 1934 |
| 1,964,926 | Moss | July 3, 1934 |
| 2,167,896 | Graham et al. | Aug. 1, 1939 |
| 2,323,039 | Hill | June 29, 1943 |

FOREIGN PATENTS

| Number | Country | Date |
|---|---|---|
| 15,011 | Australia | Aug. 15, 1903 |
| 9,808 | Great Britain | 1907 |